US006987760B2

(12) United States Patent
Calvignac et al.

(10) Patent No.: US 6,987,760 B2
(45) Date of Patent: Jan. 17, 2006

(54) HIGH SPEED NETWORK PROCESSOR (75) Inventors: Jean Louis Calvignac, Cary, NC (US); William John Goetzinger, Rochester, MN (US); Glen Howard Handlogten, Rochester, MN (US); Marco C. Heddes, Cary, NC (US); Joseph Franklin Logan, Raleigh, NC (US); James Francis Mikos, Rochester, MN (US); David Alan Norgaard, Rochester, MN (US); Fabrice Jean Verplanken, La Gaude (FR)

(73) Assignee: International Business Machines Corporation, Armonk, NY (US)

(*) Notice: Subject to any disclaimer, the term of this patent is extended or adjusted under 35 U.S.C. 154(b) by 982 days.

(21) Appl. No.: 09/838,395

(22) Filed: Apr. 19, 2001

(65) Prior Publication Data

US 2002/0122386 A1 Sep. 5, 2002

Related U.S. Application Data (60) Provisional application No. 60/273,438, filed on Mar. 5, 2001.

(51) Int. Cl.
*H04L 12/56* (2006.01)

(52) U.S. Cl. .................... 370/369; 370/469; 370/392; 709/238

(58) Field of Classification Search ................ 370/469, 370/392, 235, 351, 365, 395.1, 375, 335, 370/390, 369, 238; 455/12.1; 709/246, 238–242; 365/49; 711/148, 216
See application file for complete search history.

(56) References Cited

U.S. PATENT DOCUMENTS

| 6,400,925 | B1 | * | 6/2002 | Tirabassi et al. ........... 455/12.1 |
| 6,424,659 | B2 | * | 7/2002 | Viswanadham et al. .... 370/469 |
| 6,687,247 | B1 | * | 2/2004 | Wilford et al. ............. 370/392 |
| 6,766,381 | B1 | * | 7/2004 | Barker et al. ............... 709/246 |

OTHER PUBLICATIONS

PCT International Search Report dated May 19, 2003.
Werner Bux et al., "Technologies and Building Blocks for Fast Packet Forwarding", IEEE Communications Magazine, Jan. 2001, pp. 70–77.

* cited by examiner

*Primary Examiner*—John Pezzlo
(74) *Attorney, Agent, or Firm*—Jocelyn G. Cockburn (57) ABSTRACT

A Network Processor (NP) is formed from a plurality of operatively coupled chips. The NP includes a Network Processor Complex (NPC) Chip coupled to a Data Flow Chip and Data Store Memory coupled to the Data Flow Chip. An optional Scheduler Chip is coupled to the Data Flow Chip. The named components are replicated to create a symmetric ingress and egress structure.

9 Claims, 6 Drawing Sheets

FIG. 4A under U.S. Pat. No. 6,987,760 B2

HIGH SPEED NETWORK PROCESSOR

CROSS-REFERENCE TO RELATED PATENT APPLICATIONS

The present application relates to and claims priority of Provisional Patent Application Ser. No. 60/273,438 filed on Mar. 5, 2001.

BACKGROUND OF THE INVENTION a) Field of the Invention

The present invention relates to communications networks in general and in particular to systems for processing frames or packets in said networks.

b) Prior Art

The increase in the number of people using the internet and the increase in the volume of data transported on public and/or private networks have created the need for network devices that process packets efficiently and at media speed. Network Processors are a class of network devices that process network packets efficiently and at media speed. Examples of Network Processors are set forth in PCT Published Patent Applications WO01/16763, WO01/16779, WO01/17179, WO01/16777, and WO01/16682. The subject applications are owned and filed by International Business Machines Corporation. The architecture of those Network Processors are based on a single chip design and work remarkably well.

It is believed that as the popularity of the internet grows more people will be connected which will increase the volume of data to be transported. In addition, the volume of data in private networks will also increase. As a consequence, faster Network Processors will be required to meet the perceived increase in data volume.

The present invention described hereinafter provides a Network Processor that processes packets at a rate greater than was heretofore been possible.

SUMMARY OF THE INVENTION

The present invention provides a modular architecture for a Network Processor which includes a Network Processor Complex Chip (NPCC) and a Data Flow Chip coupled to the Network Processor Complex Chip. Separate memories are coupled to the NPCC and the Data Flow Chip, respectively.

The modular architecture provides a Scheduler Chip which is optional but if used is coupled to the Data Flow Chip.

The NPCC includes a plurality of processors executing software simultaneously to, among other things, forward network traffic.

The Data Flow Chip serves as the primary data path to receive/forward traffic from/to network ports and/or switch fabric interfaces. To this end the Data Flow Chip includes circuitries that configure selective ports to switch mode wherein data is received or dispatched in cell size chunks or line mode in which data is received or dispatched in packet or frame size chunks. The Data Flow Chip also forms the access point for entry to a Data Store Memory.

The Scheduler Chip provides for quality of service (QoS) by maintaining flow queues that may be scheduled using various algorithms such as guaranteed bandwidth, best effort, peak bandwidth etc. Two external 18-bit QDR SRAMs (66 MHz) are used to maintain up to 64K flow queues with up to 256K frames actively queued.

In one embodiment the Network Processor Complex Chip, the Data Flow Chip and the Scheduler Chip are replicated to form a Network Processor (FIG. 1) with Ingress and Egress sections. A switch interface and a media interface couple the Network Processor to a switch and communications media.

In another embodiment the one embodiment is replicated several times within a chassis to form a network device.

DETAILED DESCRIPTION OF THE PREFERRED EMBODIMENT

To the extent necessary and for teaching background information on Network Processor, reference is made to the above cited EPC Published Applications incorporated herein by reference.

Figure 1:
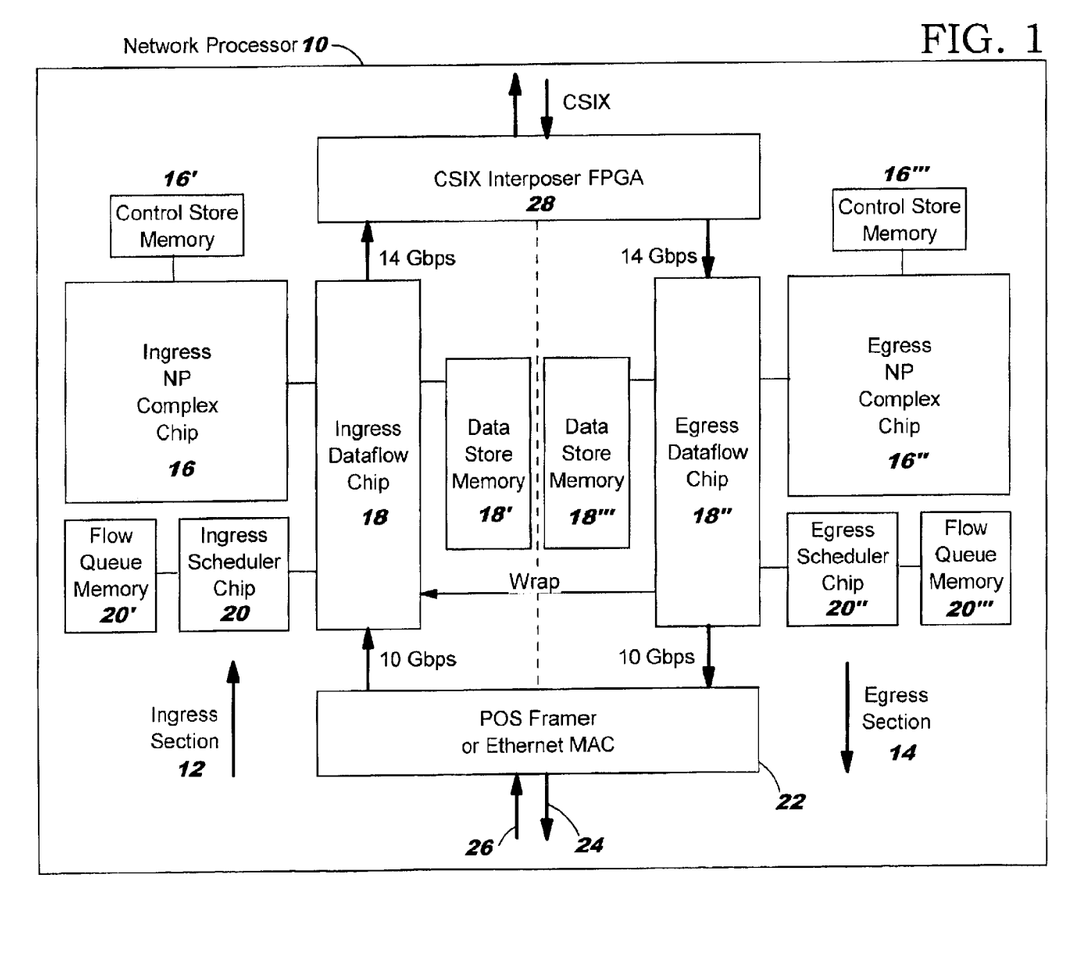
FIG. 1 shows a Network Processor according to the teachings of the present invention.

FIG. 1 shows a block diagram of a Network Processor according to the teachings of the present invention. The Network Processor 10 includes an Ingress section 12 and Egress section 14 symmetrically arranged into a symmetrical structure. The Ingress section includes Ingress Network Processor (NP) Complex Chip 16, Ingress Data Flow Chip 18 and Ingress Scheduler Chip 20. As will be explained subsequently, the Ingress Scheduler Chip 20 is optional and the Ingress section could operate satisfactorily without the Ingress Scheduler Chip. Control Store Memory 16' is connected to Ingress NP Complex Chip 16. A Data Store Memory Chip 18' is connected to Ingress Data Flow Chip 18. Flow Queue Memory 20' is connected to Ingress Scheduler Chip 20.

Still referring to FIG. 1, the Egress Section 14 replicates the chips and storage facilities enunciated for the Ingress Section 12. Because the chips and memories in the Egress Section 14 are identical to those in the Ingress Section 12, chips in the Egress Section 14 that are identical to chips in the Ingress Section 12 are identified by the same base numeral. As a consequence, Egress Data Flow Chip is identified by numeral 18" and so forth. A media interface 22 which can be a Packet Over SONET (POS) framer, Ethernet MAC or other types of appropriate interface, interconnects Network Processor 10 via transmission media 26 and 24 to a communications network (not shown). The media interface 22 can be a POS framer or Ethernet MAC. If a Packet Over SONET framer, it would interconnect one OC-192, 4×OC-48, 16×OC-13 or 64×OC-3 channels. Likewise, if an Ethernet MAC is the media interface it could connect one 10 Gbps channel, 10×1 Gbps channels or 64×100 Mbps channels. Alternately, any arrangement in the Packet Over SONET grouping or Ethernet grouping which produces 10 Gbps data into the chip or out of the chip can be selected by the designer.

Still referring to FIG. 1, the CSIX interposer interface 28 provides an interface into a switching fabric (not shown). The CSIX is a standard implemented in a Field Programmable Gate Array (FPGA). "CSIX" is the acronym used to describe the "Common Switch Interface Consortium". It is an industry group whose mission is to develop common standards for attaching devices like network processors to a switch fabric. Its specifications are publically available at www.csix.org. The "CSIX Interposer FPGA" converts the "SPI-4 Phase-1" bus interface found on the Data Flow Chip into the CSIX switch interface standard defined in the CSIX specifications. This function could also be designed into an ASIC, but it is simple enough that it could be implemented in an FPGA avoiding the cost and complexity of designing and fabricating an ASIC. It should be noted other types of interfaces could be used without deviating from the teachings of the present invention. The switching fabric could be the IBM switch known as PRIZMA or any other cross bar switch could be used. Information from the Egress Data Flow Chip 18" is fed back to the Ingress Data Flow Chip 18 via the conductor labeled WRAP. The approximate data rate of information within the chip is shown as 10 Gbps at the media interface and 14 Gbps at the switch interface. These figures are merely representative of the speed of the switch and higher speeds than those can be obtained from the architecture shown in FIG. 1. It should also be noted that one of the symmetrical halves of the Network Processor could be used with reduced throughput without deviating from the spirit and scope of the present invention. As stated previously, the replicated half of the Network Processor contains an identical chip set. This being the case, the description of each chip set forth below are intended to cover the structure and function of the chip whether the chip is in the Egress side or Ingress side.

Figure 2:
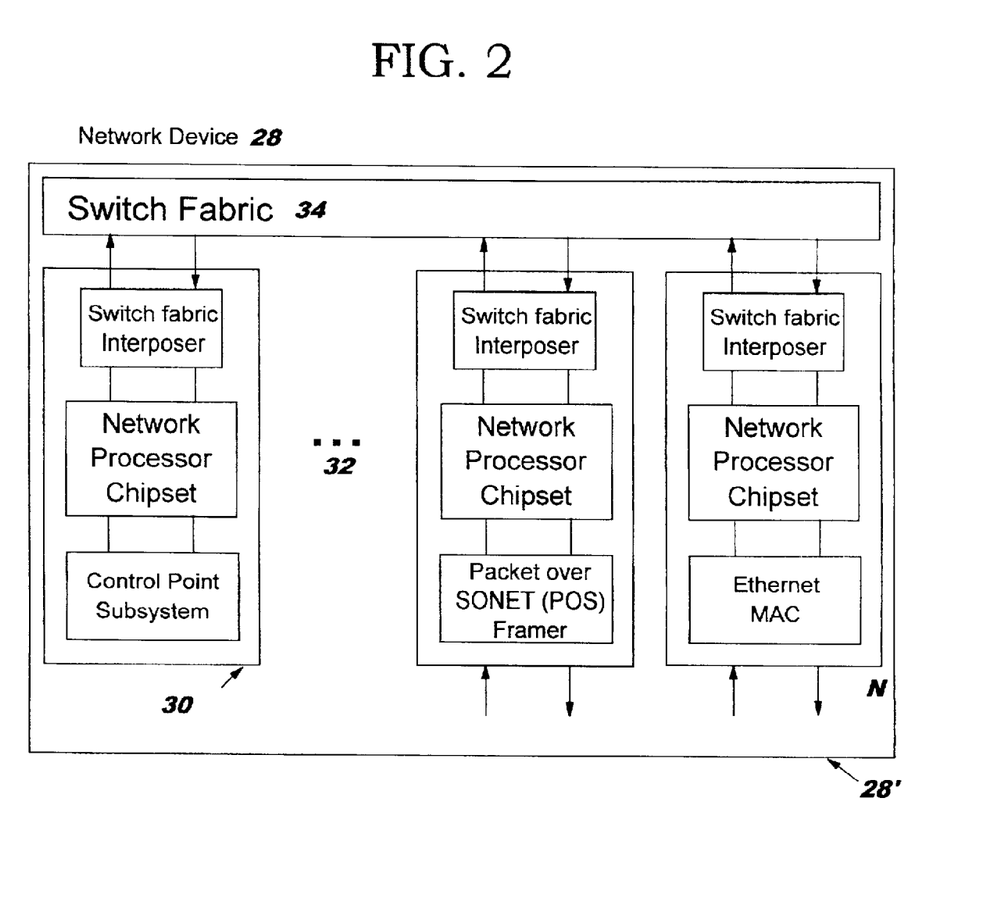
FIG. 2 shows a network device formed from the Network Processor of FIG. 1.

FIG. 2 shows a block diagram of a device for interconnecting a plurality of stations or networks (not shown). The network device 28 could be a router or similar device. The network device 28 includes a chassis 28' in which a control point subsystem 30 and Network Processors 32 through N are mounted and interconnected by switch fabric 34. In one embodiment the switch fabric is a 64×64 matrix supporting 14 Gbps ports. Each internal element of the network device includes a Network Processor (NP) Chip Set connected by a switch fabric interposer to the switch fabric 34. The Network Processor Chip Set is the name given to the six chips described herein and shown in FIG. 1. The control point subsystem executes control point code that manages the overall network device. In addition, the Network Processors 32-N are connected to Packet Over SONET framer or Ethernet MAC. As discussed herein, the Packet Over SONET framer can support 1×OC-192 channel or 4×OC-48 channels or 16×OC-12 channels or 64×OC-3 channels. In a similar way the Ethernet MAC can support 1×10 GB Ethernet channel or 10×1 GB Ethernet channel or 64×100 Mbps Ethernet channels. The arrows indicate the direction of data flow within the network device 28. Each of the Network Processor chip sets in FIG. 2 is formed from the replicated chip set described and shown in FIG. 1. Stated another way, the chip set shown in FIG. 1 is called Network Processor Chip Set and is used to build the network device shown in FIG. 2.

Alternately, 30, 32 . . . N can be viewed as blades within chassis 28'. In this configuration 30 would be the processor blades and 32 . . . N the device attached blades. Switch Fabric 34 provides communication between the blades.

Figure 3:
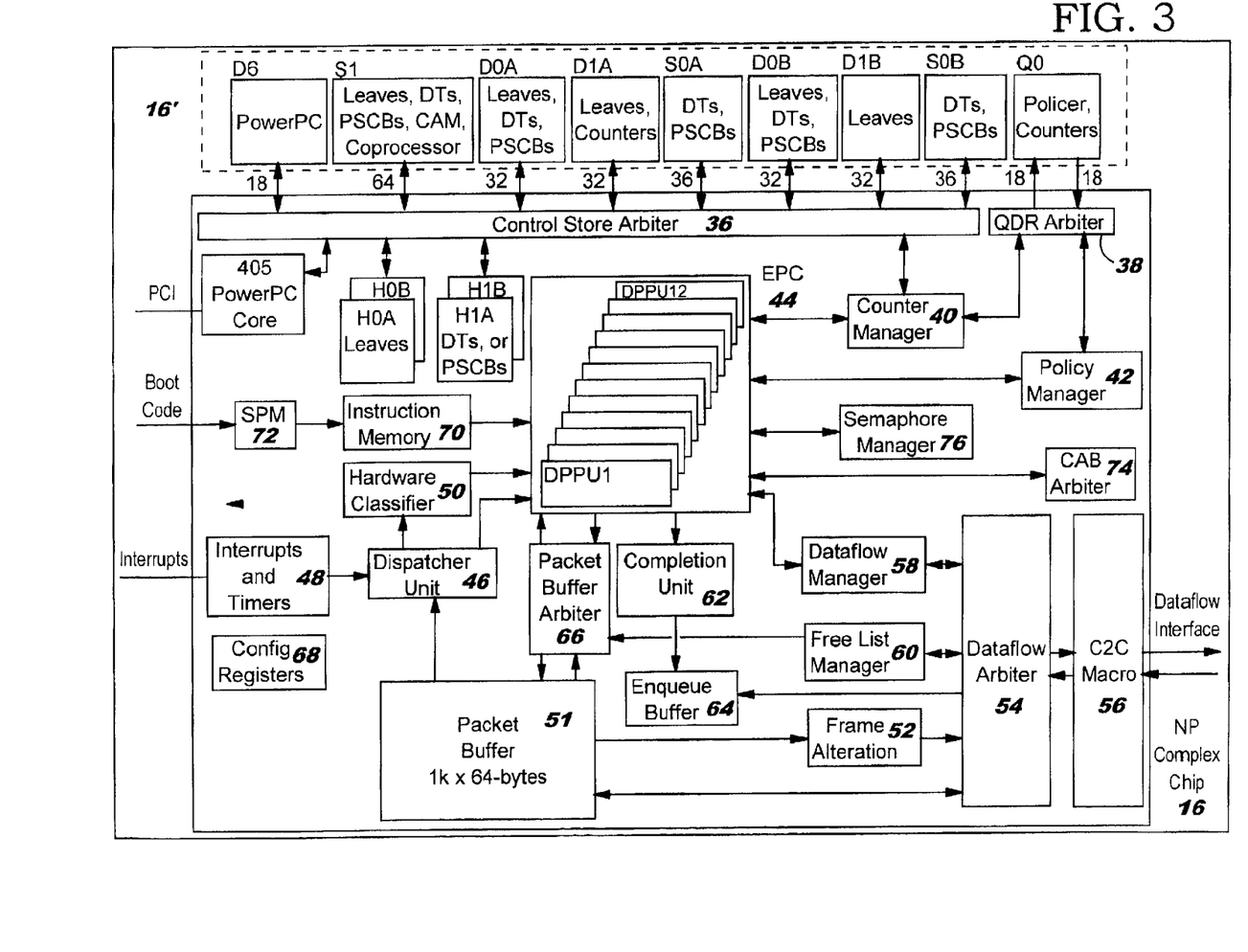
FIG. 3 shows a block diagram of the Network Processor Complex Chip.

FIG. 3 shows a block diagram of the Network Processor Complex Chip 16. The Network Processor Complex Chip executes the software responsible for forwarding network traffic. It includes hardware assist functions to be described hereinafter for performing common operations such as table searches, policing, and counting. The Network Processor Complex Chip 16 includes control store arbiter 36 that couples the Network Processor Complex Chip 16 to the control store memory 16'. The control store memory 16' includes a plurality of different memory types identified by numerals D6, S1, D0A, D1A, S0A, D0B, D1B, S0B and Q0. Each of the memory elements are connected by appropriate bus to the Control Store Arbiter 36. In operation, the control store arbiter 36 provides the interface which allows the Network Processor Complex Chip 16 to store memory 16'.

Still referring to FIG. 3 it should be noted that each of the control memories store different types of information. The type of information which each memory module stores is listed therein. By way of example D6 labeled 405 PowerPC stores information for the PowerPC core embedded in NP Complex Chip 16. Likewise, storage element labeled S1 stores leaves, direct tables (DTs), pattern search control blocks (PSCBs). The information is necessary to do table look-ups and other tree search activities. Likewise, D0A stores information including leaves, DTs, PSCBs. In a similar manner the other named storage stores information which are identified therein. The type of information stored in these memories are well known in Network Processor technology. This information allows data to be received and delivered to selected ports within the network. This type of information and usage is well known in the prior art and further detailed description is outside the scope of this invention and will not be given.

Still referring to FIG. 3, QDR arbiter 38 couples the counter manager 40 and policy manager 42 to Q0 memory module which stores policy control blocks and counters. The counter manager assists in maintenance of statistical counters within the chip and is connected to control store arbiter 36 and embedded processor complex (EPC) 44. The policy manager 42 assists in policing incoming traffic flows. "Policing" is a commonly understood term in the networking industry which refers to function that is capable of limiting the data rate for a specific traffic flow. For example, an internet service provider may allow a customer to transmit only 100 Mbits of data on their Internet connection. The policing function would permit 100 Mbits of traffic and no more to pass. Anything beyond that would be discarded. If the customer wants a higher data rate, then they can pay more money to the internet service provider and have the policing function adjusted to pass a higher data rate. It maintains dual leaky bucket meters on a per traffic flow basis with selectable parameters and algorithms.

Still referring to FIG. 3 the embedded processor complex (EPC) 44 includes 12 dyadic protocol processor units (DPPUs) which provides for parallel processing of network traffic. The network traffic is provided to the EPC 44 by dispatcher unit 46. The dispatcher unit 46 is coupled to interrupts and timers 48 and hardware classifier 50. The hardware classifier 50 assists in classifying frames before they are forwarded to the EPC 44. Information into the dispatcher is provided through packet buffer 51 which is connected to frame alteration logic 52 and data flow arbiter 54. The data flow arbiter 54 is connected by a chip-by-chip (C2C) macro 56 which is coupled to the data flow interface. The C2C macro provides the interface that allows efficient exchange of data between the Network Processor chip and the Data Flow chip.

The data flow arbiter 54 provides arbitration for the data flow manager 58, frame alteration 52 and free list manager 60. The data flow manager 58 controls the flow of data between the NP Complex Chip 16 and the Data Flow chip. The free list manager provides the free list of buffers that is available for use. A completion unit 62 is coupled to EPC 44.

The completion unit provides the function which ensures that frames leaving the EPC 44 are in the same order as they were received. Enqueue buffer 64 is connected to completion unit 62 and enqueue frames received from the completion unit to be transferred through the Chip-to-Chip interface. Packet buffer arbiter 66 provides arbitration for access to packet buffer 51. Configuration registers 68 stores information for configuring the chip. An instruction memory 70 stores instructions which are utilized by the EPC 44. Access for boot code in the instruction memory 70 is achieved by the Serial/Parallel Manager (SPM) 72. The SPM loads the initial boot code into the EPC following power-on of the NP Complex Chip.

The interrupts and timers 48 manages the interrupt conditions that can request the attention of the EPC 44. CAB Arbiter 74 provides arbitration for different entities wishing to access registers in the NP Complex Chip 16. Semaphore manager 76 manages the semaphore function which allows a processor to lock out other processors from accessing a selected memory or location within a memory. A PCI bus provides external access to the 405 PowerPC core. On chip memories H0A, H0B, H1A and H1B are provided. The on chip memories are used for storing leaves, DTs or pattern search control blocks (PSCBs). In one implementation H0A and H0B are 3K×128 whereas H1A and H1B are 3K×36. These sizes are only exemplary and other sizes can be chosen depending on the design.

Still referring to FIG. 3 each of the 12 DPPU includes two picocode engines. Each picocode engine supports two threads. Zero overhead context switching is supported between threads. The instructions for the DPPU are stored in instruction memory 70. The protocol processor operates on a frequency of approximately 250 mhz. The dispatcher unit 46 provides the dispatch function and distributes incoming frames to idle protocol processors. Twelve input queue categories permit frames to be targeted to specific threads or distributed across all threads. The completion unit 62 functions to ensure frame order is maintained at the output as when they were delivered to the input of the protocol processors. The 405 PowerPC embedded core allows execution of higher level system management software. The PowerPC operates at approximately 250 mhz. An 18-bit interface to external DDR SDRAM (D6) provides for up to 128 megabytes of instruction store. The DDR SDRAM interface operates at 125 mhz (250 mhz DDR). A 32-bit PCI interface (33/66 mhz) is provided for attachment to other control point functions or for configuring peripheral circuitry such as MAC or framer components.

Still referring to FIG. 3 the hardware classifier 50 provides classification for network frames. The hardware classifier parses frames as they are dispatched to protocol processor to identify well known (LAYER-2 and LAYER-3 frame formats). The output of classifier 50 is used to precondition the state of picocode thread before it begins processing of each frame.

Among the many functions provided by the Network Processor Complex Chip 16 is table search. Searching is performed by selected DPPU the external memory 16' or on-chip memories H0A, H0B, H1A or H1B. The table search engine provides hardware assists for performing table searches. Tables are maintained as Patricia trees with the termination of a search resulting in the address of a "leaf" entry which picocode uses to store information relative to a flow. Three table search algorithms are supported: Fixed Match (FM), Longest Prefix Match (LPM), and a software managed tree (SMT) algorithm for complex rules-based searches. The search algorithms are beyond the scope of this invention and further description will not be given hereinafter.

Control store memory 16' provides large DRAM tables and fast SRAM tables to support wire speed classification of millions of flows. Control store includes two on-chip 3K×36 SRAMs (H1A and H1B), two on-chip 3K×128 SRAMs (H0A and H0B), four external 32-bit DDR SDRAMs (D0A, D0B, D1A, and D1B), two external 36-bit ZBT SRAMs (S0A and S0B), and one external 72-bit ZBT SRAM (S1). The 72-bit ZBT SRAM interface may be optionally used for attachment of a contents address memory (CAM) for improved lookup performance. The external DDR SDRAMs and ZBT SRAMs operate at frequencies of up to 166 mhz (333 mhz DDR). The numerals such as 18, 64, 32 etc. associated with bus for each of the memory elements in FIG. 3 represent the size of the data bus interconnecting the respective memory unit to the control store arbiter. For example, 18 besides the bus interconnecting the PowerPC memory D6 to control store arbiter 36 indicates that the data bus is 18 bits wide and so forth for the others.

Still referring to FIG. 3, other functions provided by the Network Processor Complex Chip 16 includes frame editing, statistics gathering, policing, etc. With respect to frame editing the picocode may direct-edit a frame by reading and writing data store memory attached to the data flow chip (described herein). For higher performance, picocode may also generate frame alteration commands to instruct the data flow chip to perform well known modifications as a frame is transmitted via the output port.

Regarding statistic information a counter manager 40 provides function which assists picocode in maintaining statistical counters. An on chip 1K×64 SRAM and an external 32-bit QDR SRAM (shared with the policy manager) may be used for counting events that occur at 10 Gbps frame interval rates. One of the external control stores DDR SDRAMs (shared with the table search function) may be used to maintain large numbers of counters for events that occur at a slower rate. The policy manager 42 functions to assist picocode in policing incoming traffic flows. The policy manager maintains up to 16K leaky bucket meters with selectable parameters and algorithms. 1K policing control blocks (PolCBs) may be maintained in an on-chip SRAM. An optional external QDR SRAM (shared with the counter manager) may be added to increase the number of PolCBs to 16K.

Figure 4:
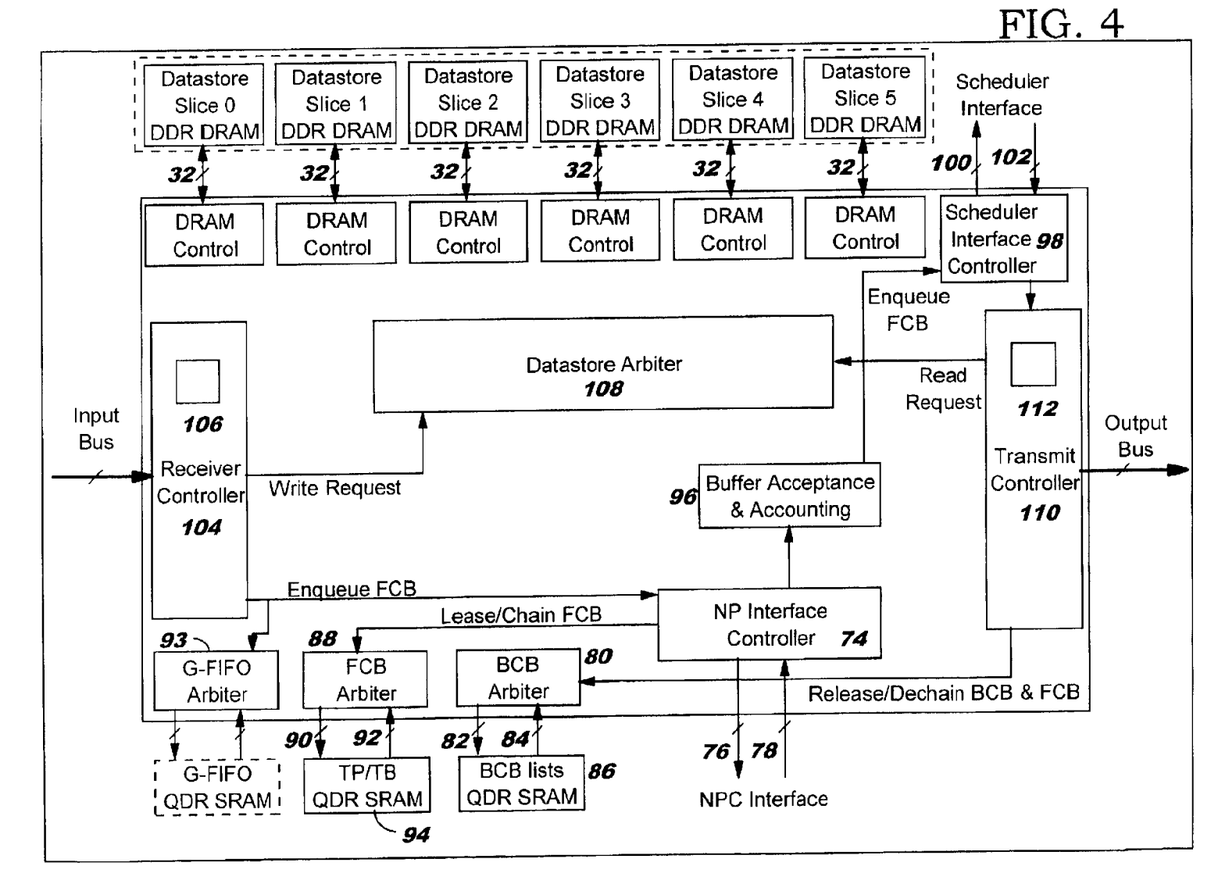
FIG. 4 shows a block diagram of the Data Flow Chip.

FIG. 4 shows a block diagram of the Data Flow Chip. The Data Flow Chip serves as a primary data path for transmitting and receiving data via network port and/or switch fabric interface. The Data Flow Chip provides an interface to a large data store memory labeled data store slice 0 through data store slice 5. Each data store slice is formed from DDR DRAM. The data store serves as a buffer for data flowing through the Network Processor subsystem. Devices in the Data Flow Chip dispatches frame headers to the Network Processor Complex Chip for processing and responds to requests from the Network Processor Complex Chip to forward frames to their target destination. The Data Flow Chip has an input bus feeding data into the Data Flow Chip and output bus feeding data out of the data flow chip. The bus is 64 bits wide and conforms to the Optical Internetworking Forum's standard interface known as SPI-4 Phase-1. However, other similar busses could be used without deviating from the teachings of present invention. The slant lines on each of the busses indicate that the transmission line is a bus. Network Processor (NP) Interface Controller 74 connects the Data Flow Chip to the Network Processor Complex (NPC) Chip. Busses 76 and 78 transport data from the NP interface controller 74 into the NPC chip and from the NPC chip into the NP Interface Controller 74. BCD arbiter 80 is coupled over a pair of busses 82 and 84 to storage 86. The storage 86 consists of QDR SRAM and stores Buffer Control Block (BCB) lists. Frames flowing through Data Flow Chip are stored in a series of 64-byte buffers in the data store memory. The BCB lists are used by the Data Flow Chip hardware to maintain linked lists of buffers that form frames. FCB arbiter 88 is connected over a pair of busses 90 and 92 to memory 94. The memory 94 consists of QDR SRAM and stores Frame Control Blocks (FCB) lists. The FCB lists are used by the Data Flow Chip hardware to maintain linked lists that form queues of frames awaiting transmission via the Transmit Controller 110. G-FIFO arbiter is connected over a pair of busses to a memory. The memory consists of QDR SRAM and stores G-Queue lists. The G-Queue lists are used by the Data Flow Chip hardware to maintain linked lists that form queues of frames awaiting dispatch to the NPC Chip via the NP Interface Controller 74.

Still referring to FIG. 4, the NP Interface Controller 74 is connected to buffer acceptance and accounting block 96. The buffer acceptance and accounting block implements well known congestion control alogrithms such as Random Early Discard (RED). These algorithms serve to prevent or relieve congestion that may arise when the incoming data rate exceeds the outgoing data rate. The output of the buffer acceptance and control block generates an Enqueue FCB signal that is fed into Scheduler Interface controller 98. The Scheduler Interface controller 98 forms the interface over bus 100 and 102 into the scheduler. The Enqueue FCB signal is activated to initiate transfer of a frame into a flow queue maintained by the Scheduler Chip.

Still referring to FIG. 4, the Data Flow Chip includes a Receiver Controller 104 in which Receiver port configuration device 106 (described hereinafter) is provided. The function of receiver controller 104 is to receive data that comes into the Data Flow Chip and is to be stored in the data store memory. The receiver controller 104 on receiving data generates a write request signal which is fed into data store arbiter 108. The data store arbiter 108 then forms a memory vector which is forwarded to one of the DRAM controllers to select a memory over one of the busses interconnecting a data store slice to the Data Flow Chip.

The Receiver port configuration circuit 106 configures the receive port into a port mode or a switch mode. If configured in port mode data is received or transmitted in frame size block. Likewise, if in switch mode data is received in chunks equivalent to the size of data which can be transmitted through a switch. The transmit controller 110 prepares data to be transmitted on SPI-4 Phase-1 to selected ports (not shown). Transmit Port configuration circuit 112 is provided in the transmit controller 110 and configures the transmit controller into port mode or switch mode. By being able to configure either the receive port or the transmit port in port or switch mode, a single Data Flow Chip can be used for interconnection to a switch device or to a transmission media such as Ethernet or POS communications network. In order for the transmit controller 110 to gain access to the data store memory the transmit controller 110 generates a read request which the data store arbiter uses to generate a memory vector for accessing a selected memory slice.

Still referring to FIG. 4, the transmit and receive interfaces can be configured into port mode or switch mode. In port mode, the data flow exchanges frames for attachment of various network media such as ethernet MAC or Packet Over SONET (POS) framers. In one embodiment, in switch mode, the data flow chip exchanges frames in the form of 64-byte cell segments for attachment to a cell-based switch fabric. The physical bus implemented by the data flow's transmit and receive interfaces is OIF SPI-4 Phase-1 (64-bit HSTL data bus operating at up to 250 mhz). Throughput of up to 14.3 Gbps is supported when operating in switch interface mode to provide excess bandwidth for relieving Ingress Data Store Memory congestion. Frames may be addressed to up to 64 target Network Processor subsystems via the switch interface and up to 64 target ports via the port interface. The SBI-4 Phase-1 interface supports direct attachment of industry POS framers and may be adapted to industry Ethernet MACs and to switch fabric interfaces (such as CSIX) via programmable gate array (FPGA logic).

Still referring to FIG. 4, the large data memory attached to the Data Flow Chip provides a network buffer for absorbing traffic bursts when the incoming frames rate exceeds the outgoing frames rate. The memory also serves as a repository for reassembling IP fragments and as a repository for frame awaiting possible retransmission in applications like TCP termination. Six external 32-bit DDR DRAM interfaces are supported to provide sustained transmit and receive bandwidth of 10 Gbps for the port interface and 14.3 Gbps for the switch interface. It should be noted that these bandwidths are examples and should not be construed as limitations on the scope of the present invention. Additional bandwidth is reserved direct read/write of data store memory by Network Processor Complex Chip picocode.

The Data Store memory is managed via link lists of 64-byte buffers. The six DDR DRAMs support storage of up to 2,000,000 64-byte buffers. The DDR DRAM memory operates at approximately 166 mhz (333 mhz DDR). The link lists of buffers are maintained in two external QDR SRAM 86 and 94 respectively. The data flow implements a technique known as ("Virtual Output Queueing") where separate output queues are maintained for frames destined for different output ports or target destinations. This scheme prevents "head of line blocking" from occurring if a single output port becomes blocked. High and low priority queues are maintained for each port to permit reserved and nonreserved bandwidth traffic to be queued independently. These queues are maintained in transmit controller 110 of the Data Flow Chip.

Figure 4A:
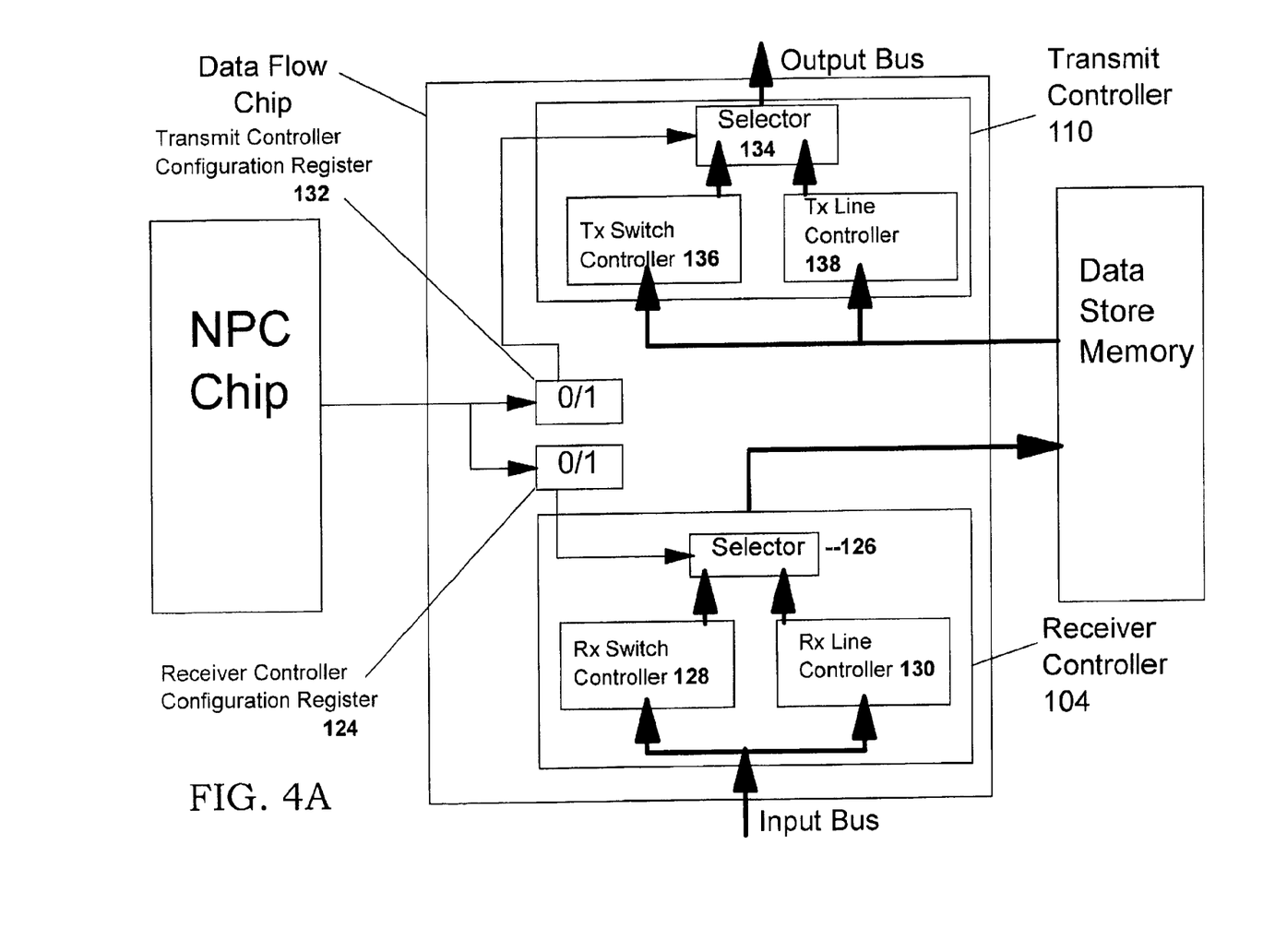
FIG. 4A shows a circuit arrangement that configures selected ports of the Data Flow Chip to be in the switch or line mode.

FIG. 4A shows a block diagram for Receiver Port Configuration Circuit 104 and Transmit Port Configuration Circuit 106 located in the Data Flow Chip. The circuits configure the Transmit and Receiver Controller functions to operate in switch mode or line mode. The Receiver Port Configuration Circuit includes Receiver Controller Configuration Register 124, Selector 126, Rx Switch Controller 128 and Rx Line Controller 130. The Rx (Receiver) Switch Controller 128 receives a series of fixed length cells and reassembles them into a frame. The Rx (Receiver) Line Controller 130 receives contiguous bytes of data and configured them into a frame. The selector 126, under the control of the Receiver Controller Configuration Register 124, selects either the output from the Rx Controller 128 or the output from Rx Line Controller 130. The data at the selected output is written in the Data Store Memory.

Still referring to FIG. 4A, the Transmit Port Configuration Circuit includes Transmit Controller Configuration Register 132, Tx (Transmit) Switch Controller 136, Tx Line Controller 138 and Selector 134. The Tx Switch Controller 136 reads a frame from Data Store Memory and segments them into streams of continuous bytes. The Selector 134, under the control of the Transmit Controller Configuration Register, selects the output from the Tx Switch Controller 136 or the output from the Tx Line Controller 138.

In switch mode, the Receiver Controller receives a frame from an input bus as a series of fixed length cells and reassembles them into a frame that is written into Data Store Memory, and the Transmit Controller reads a frame from Data Store Memory and segments it into a series of fixed length cells before transmitting them via the output bus. In line mode, the Receiver Controller receives a frame from an input bus as a contiguous stream of bytes that are written into Data Store Memory, and the Transmit Controller reads a frame from Data Store Memory and transmits it as a contigous stream of bytes via the output bus. The Transmit Controller and Receiver Controller can be independently configured to operate in switch mode or line mode. The NPC Chip writes two configuration register bits within the Data Flow Chip to configure the mode of operation. One bit configures whether the Transmit Controller operates in switch or line mode. The other bit configures whether the Receive Controler operates in switch or line mode. The Transmit Controller contains separate circuits that implement the transmit switch and line modes of operation. Its associated register bit selects whether the transmit switch or line mode circuitry is activated. Likewise, the Receive Controller contains separate circuits that implement the receive switch and line modes of operation. Its associated register bit selects whether the receive line or switch mode circuitry is activated.

Figure 5:
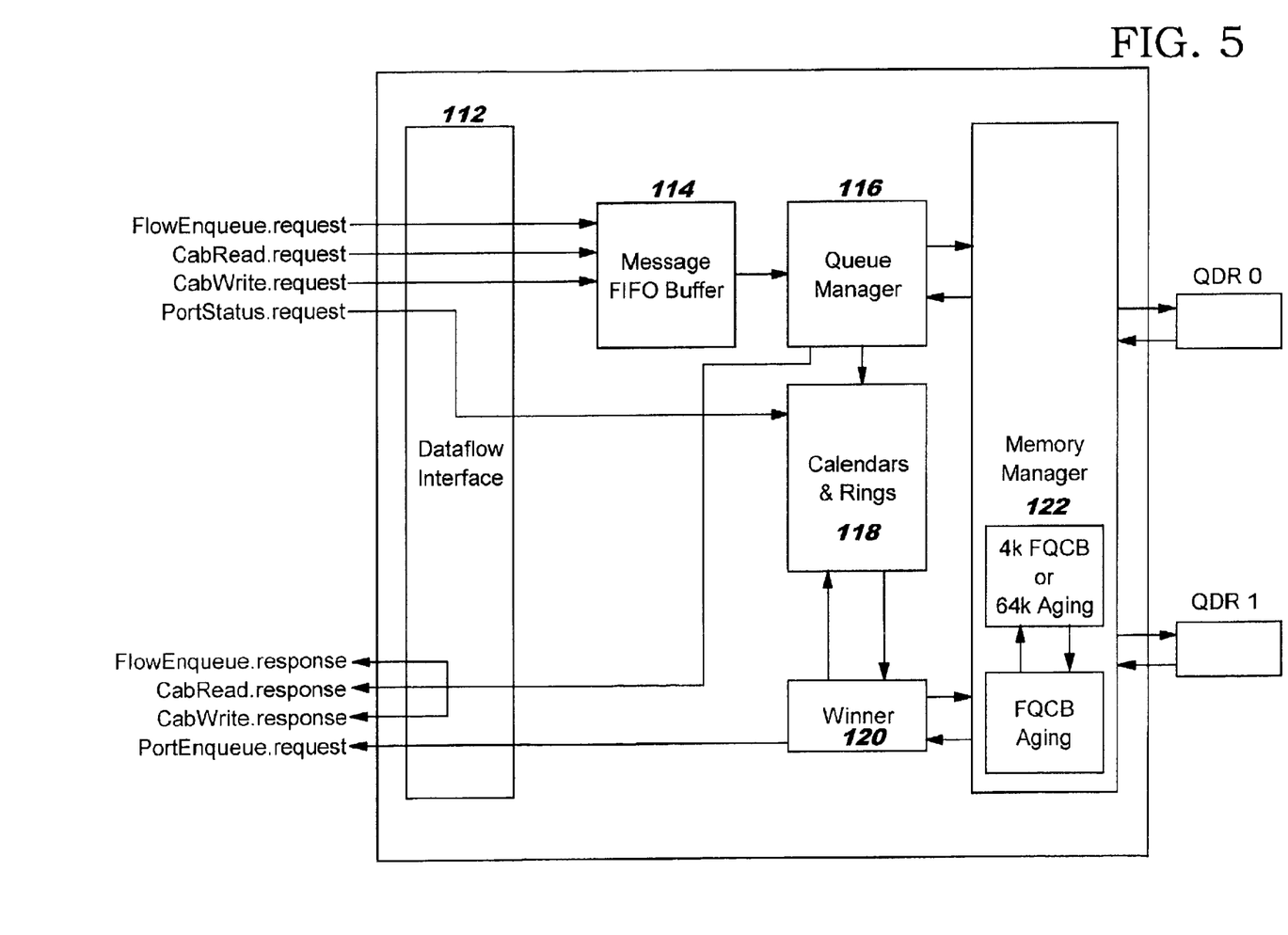
FIG. 5 shows a block diagram for the Scheduler Chip.

FIG. 5 shows a block diagram of the Scheduler Chip. The Scheduler Chip is optional but provides enhanced quality of service to the Network Processor subsystem, if used. The Scheduler permits up to 65,536 network (traffic "flows" to be individually scheduled per their assigned quality of service level). The Scheduler Chip includes data flow interface 112, message FIFO buffer 114, queue manager 116, calendars and rings 118, winner 120, memory manager 122, and external memory labeled QDR 0 and QDR 1. The named components are interconnected as shown in FIG. 5. The data flow bus interface provides the interconnect bus between the Scheduler and the Data Flow Chip. Chipset messages are exchanged between modules using this bus. The interface is a double data source synchronous interface capable of up to 500 Mbps per data pin. There is a dedicated 8-bit transmit bus and a dedicated 8-bit receive bus, each capable of 4 Gbps. The messages crossing the interface to transport information are identified in FIG. 5.

The message FIFO buffer 114 provides buffering for multiple Flow Enqueue.Request, CabRead.request and CabWrite.request messages. In one embodiment the buffer has capacity for 96 messages. Of course numbers other than 96 can be buffered without deviating from the scope or spirit of the invention. The Scheduler processes these messages at a rate of one per TICK in the order on which they arrive. If messages are sent over the chip-to-chip interface at a rate greater than one per TICK they are buffered for future processing.

Still referring to FIG. 5, the Queue manager block processes the incoming message to determine what action is required. For a flow enqueue request message the flow enqueue information is retrieved from memory and examined to determine if the frame should be added to the flow queue frame stream or discarded. In addition, the flow queue may be attached or calendared for servicing in the future, CabRead.request and CabWrite.response and CabWrite.response messages respectively.

The calendars and rings block 118 are used to provide guaranteed bandwidth with both a low latency sustainable (LLS) and a normal latency sustainable (NLS) packets rate. As will be discussed below there are different types of rings in the calendars and rings block. One of the rings WFQ rings are used by the weighted fear queueing algorithm. Entries are chosen based on position in the ring without regard to time (work conserving).

Winner block 120 arbitrates between the calendar and rings to choose which flow will be serviced next.

The memory manager coordinates data, reads and writes from/to the external QDR 0, QDR 1 and internal Flow Queue Control Blocks (FQCB)/aging array. The 4K FQCB or 64K aging memory can be used in place of QDR 0 to hold time-stamped aging information. The FQCB aging memory searches through the flows and invalidates old timestamps flows. Both QDR 0 and QDR 1 are external memories storing frame control block (FCB) and FQCB.

The Scheduler provides for quality of service by maintaining flow queues that may be scheduled using various algorithms such as "guaranteed bandwith", "best effort", "peak bandwidth", etc. QDR 0 and QDR 1 are used for storing up to 64K flow queues for up to 256K frames actively queued. The Scheduler supplements the data flows congestion control algorithm by permitting frames to be discarded based on per flow queue threshold.

Still referring to FIG. 5, the queue manager 116 manages the queueing function. The queueing function works as follows: a link list of frames is associated with the flow. Frames are always enqueued to the tail of the link list. Frames are always dequeued from the head of the link list. Frames are attached to one of the four calendars (not shown) in block 118. The four calendars are LLS, NLS, PBS, WFQ. Selection of which flow to service is done by examining the calendar in this order LLS, NLS, PBS and WFQ. The flow queues are not grouped in any predetermined way to target port/target blade. The port number for each flow is user programmable via a field in the FQCB. All flows with the same port id are attached to the same WFQ calendar. The quality of service parameter is applied to the discard flow. The discard flow address is user-selectable and is set up at configuration time.

As stated above there are four calendars. The LLS, NLS and PBS are time-based. WFQ is wait-based. A flow gets attached to a calendar in a manner consistent with its quality of service parameters. For example, if a flow has a guaranteed bandwidth component it is attached to a time-based calendar. If it has a WFQ component it is attached to the WFQ calendar.

Port back pressure from the data flow to the scheduler occurs via the port status that request message originated from the Data Flow Chip. When a port threshold is exceeded, all WFQ and PBS traffic associated with that port is held in the Scheduler (the selection logic doesn't consider those frames potential winners). When back pressure is removed the frames associated with that port are again eligible to be a winner. The Scheduler can process one frame, dequeue every 36 nanoseconds for a total of 27 million frames/per second. Scheduling rate per flow for LLS, NLS, and PBS calendars range from 10 Gbps to 10 Kbps. Rates do not apply to the WFQ calendar.

Quality of service information is stored in the flow queue control blocks FQCBs QDR 0 and QDR 1. The flow queue control blocks describe the flow characteristics such as sustained service rate, peak service rate, weighted fair queue characteristic, port id, etc. When a port enqueue request is sent to the Scheduler the following takes place:

Frame is tested for possible discard using 2 bits from PortEnqueue plus flow threshold in FQCB. If the frame is to be discarded the FQCB pointer is changed from the FQCB in PortEnqueue.request to the discard FQCB.

The frame is added to the tail end of the FCB chain associated with the FQCB

If the flow is eligible for a calendar attach, it is attached to the appropriate calendar (LLS, NLS, PBS, or WFQ).

As time passes, selection logic determines which flow is to be serviced (first LLS, then NLS, then PBS, then WFQ). If port threshold has been exceed, the WFQ and PBS associated with that port are not eligible to be selected.

When a flow is selected as the winner, the frame at the head of the flow is dequeued and a PortEnqueue. Request message is issued.

If the flow is eligible for a calendar re-attach, it is re-attached to the appropriate calendar (LLS, NLS, PBS, or WFQ) in a manner consistent with the QoS parameters.

While the invention has been defined in terms of Preferred Embodiments in specific system environment, those of ordinary skill in the art will recognize that the invention can be practiced, with mofidication, in other and different hardware and software environments without departing from the scope and spirit of the present invention.

What is claimed is:

1. A device including:
   a Network Processor Complex Chip including a plurality of co-processors executing programs that forward frames or hardware assist functions that performs operations like table searches, policing and counting;
   a Data Flow Chip operatively coupled to the Network Processor Complex Chip, said Data Flow Chip including at least one port to receive/transmit data and circuit arrangement that sets the at least one port into switch mode and/or line mode; and a Scheduler Chip operatively coupled to the Data Flow Chip, said Scheduler Chip scheduling frames to meet predetermined Quality of Service commitments.

2. The device of claim 1 further including a first memory operatively coupled to the Network Processor Complex Chip, a second memory operatively coupled to the Data Flow Chip and a third memory operatively coupled to the Scheduler Chip.

3. A device including:
   an ingress section and an egress section symmetrically arranged, said ingress section and said egress section each including
   Network Processor Complex Chip having a plurality of co-processors programmed to execute code that forwards network traffic;
   a Data Flow Chip operatively coupled to the Network Processor Complex Chip; said Data Flow Chip having at least one port and circuitry to configure said port into a switch mode or a line mode; and
   a Scheduler Chip operatively coupled to said Data Flow Chip, said Scheduler Chip including circuits that schedule frames to meet predetermined Quality of Service commitments.

4. A device including:
   an ingress section;
   an egress section symmetrically arranged to said ingress section wherein said ingress section includes a First Data Flow Chip having at least a first input port and a first output port;
   a First Network Processor Complex Chip operatively coupled to said Data Flow Chip;
   a First Scheduler Chip operatively coupled to said Data Flow Chip; and
   said egress section including a second Data Flow Chip having at least a second output and a second input;
   a second Network Processor Chip operatively coupled to said Second Data Flow Chip;
   a second Scheduler Chip operatively coupled to the Second Data Flow Chip; and
   communication media that wraps the Second Data Flow Chip to the First Data Flow Chip.

5. The device of claim 4 further including a Switch interface operatively coupled to the first output port and the second input port.

6. The device of claim 4 further including a line interface operatively coupled to the first input port and the second output port.

7. A device including:
   an ingress section; and
   an egress section symmetrically arranged to said ingress section wherein said ingress section includes a First Data Flow Chip having at least a first input port and a first output port;
   a First Network Processor Chip operatively coupled to said Data Flow Chip;
   a First Scheduler Chip operatively coupled to said Data Flow Chip; and
   said egress section including a second Data Flow Chip having at least a second output port and a second input port;
   a second Network Processor Chip operatively coupled to said Second Data Flow Chip;
   a second Scheduler Chip operatively coupled to the Second Data Flow Chip;
   communication media that wraps the Second Data Flow Chip to the First Data Flow Chip;
   a first interface operatively coupled to the first output port and the second input port; and
   a second interface operatively coupling the first input port and the second output port.

8. A network device including:
   a switch fabric and
   a plurality of Network Processors connected in parallel to said switch fabric wherein each of the Network Processors including
   an ingress section;
   an egress section symmetrically arranged to said ingress section wherein said ingress section including a First Data Flow Chip having at least a first input port and a first output port;
   a First Network Processor Complex Chip operatively coupled to said first Data Flow Chip;
   a First Scheduler Chip operatively coupled to said Data Flow Chip; and
   said egress section including a second Data Flow Chip having at least a second output port and a second input port;
   a second Network Processor Chip operatively coupled to said Second Data Flow Chip;
   a second Scheduler Chip operatively coupled to the Second Data Flow Chip;
   communication media that wraps the Second Data Flow Chip to the First Data Flow Chip;
   a first interface operatively coupled to the first output port and the second input port; and
   a second interface operatively coupling the first input port and the second output port.

9. A Network Processor including:
   a Network Processor Complex Chip having a plurality of co-processors;
   a memory operatively connected to said Network Processor; and
   a Data Flow Chip operatively coupled to said Network Processor Chip, said Data Flow Chip including at least an output port, an input port; and
   control mechanism that sets at least the input port or the output port into a switch mode or a line mode.

* * * * *